(12) United States Patent
Guimaraes et al.

(10) Patent No.: US 7,053,935 B2
(45) Date of Patent: May 30, 2006

(54) APPARATUS AND METHOD FOR ACCURATE ELECTRONIC COLOR CAPTURE AND REPRODUCTION

(75) Inventors: Marcelo de C. Guimaraes, Rochester, NY (US); Nestor M. Rodriguez, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 856 days.

(21) Appl. No.: 10/080,231

(22) Filed: Feb. 21, 2002

(65) Prior Publication Data

US 2003/0156214 A1    Aug. 21, 2003

(51) Int. Cl.
*H04N 5/228* (2006.01)
*G06K 9/00* (2006.01)

(52) U.S. Cl. .................. 348/222.1; 382/162; 382/167

(58) Field of Classification Search ............ 348/222.1, 348/223.1, 230.1, 266, 273, 342; 358/527; 382/254, 167, 162; 430/30
See application file for complete search history.

(56) References Cited

U.S. PATENT DOCUMENTS

| | | | | |
|---|---|---|---|---|
| 3,789,132 A | | 1/1974 | Larsen ................. 178/5.4 |
| 4,278,538 A | * | 7/1981 | Lawrence et al. ........ 209/580 |
| 4,935,816 A | | 6/1990 | Faber ..................... 358/160 |
| 5,475,425 A | | 12/1995 | Przyborski et al. ...... 348/239 |
| 5,579,132 A | * | 11/1996 | Takahashi et al. ......... 358/527 |
| 5,582,961 A | | 12/1996 | Giorgianni et al. ....... 430/508 |
| 5,609,978 A | * | 3/1997 | Giorgianni et al. ......... 430/30 |
| 5,668,596 A | * | 9/1997 | Vogel ...................... 348/222.1 |
| 6,160,912 A | * | 12/2000 | Usami ................... 382/167 |
| 6,269,217 B1 | | 7/2001 | Rodriguez ................ 386/46 |
| 6,459,449 B1 | * | 10/2002 | Juen ...................... 348/223.1 |
| 6,822,657 B1 | * | 11/2004 | Baer ....................... 345/589 |

OTHER PUBLICATIONS

"The Theory of the Photographic Process", Fourth Edition, New York: Macmillan Publishing Co., 1997, pp. 561-577.
"Optimization of Camera Spectral Sensitivities" by S. Quan, N. Ohta, and N. Katah (IS&T/SID Eighth Color Imaging Conference, 2000), pp. 273-278.

* cited by examiner

*Primary Examiner*—Lin Ye
(74) *Attorney, Agent, or Firm*—Stephen H. Shaw (57) ABSTRACT

An electronic color image capture system includes an optical section for separating an input image into its separate color content and directing the separate color content toward an imaging section, which generates a plurality of color image signals from the input image. The spectral responses of the optical section and the imaging section are selected so as to cascade together to provide all-positive, symmetrical system curves modeled upon red, green and blue color matching functions representative of the human visual system. The color matching functions are derived from three monochromatic light sources and contain no more than three positive lobes as well as one or more negative lobes, wherein the areas under the color matching functions determined by (a) summation of all negative lobes and (b) overlap between the green and red color matching functions are minimized. The color image signals are processed with a color correction matrix with coefficients optimized for signal-to-noise performance for producing an output color image exhibiting an accurate color reproduction of the input image.

11 Claims, 5 Drawing Sheets

APPARATUS AND METHOD FOR ACCURATE ELECTRONIC COLOR CAPTURE AND REPRODUCTION

FIELD OF THE INVENTION

The invention relates generally to the field of electronic capture and processing of motion image sequences, and more particularly to method and apparatus for more accurate color reproduction than that offered by currently available electronic and traditional capture devices.

BACKGROUND OF THE INVENTION

In the motion picture industry, a variety of techniques and systems are currently employed in the capture of scenes (light). Basically, three distinct classes of capture systems are used for the origination of images: traditional motion picture film systems, electronic systems and combinations of both systems (i.e., hybrid systems). When an electronic or hybrid capture system is chosen for the origination of images, it is common practice to apply some sort of processing to the images before they are displayed. In many cases, the image processing is done in order to mimic the "film look" so that electronically originated images can be perceived, when displayed, as if they were originally captured onto film. Several examples in the prior art can be found for electronic capture devices and methods which attempt to emulate the "film look", e.g., see U.S. Pat. No. 4,935,816 (Method And Apparatus For Video linage Film Simulation) and U.S. Pat. No. 5,475,425 (Apparatus And Method For Creating Video Outputs That Emulate The Look Of Motion Picture Film).

Figure 1:
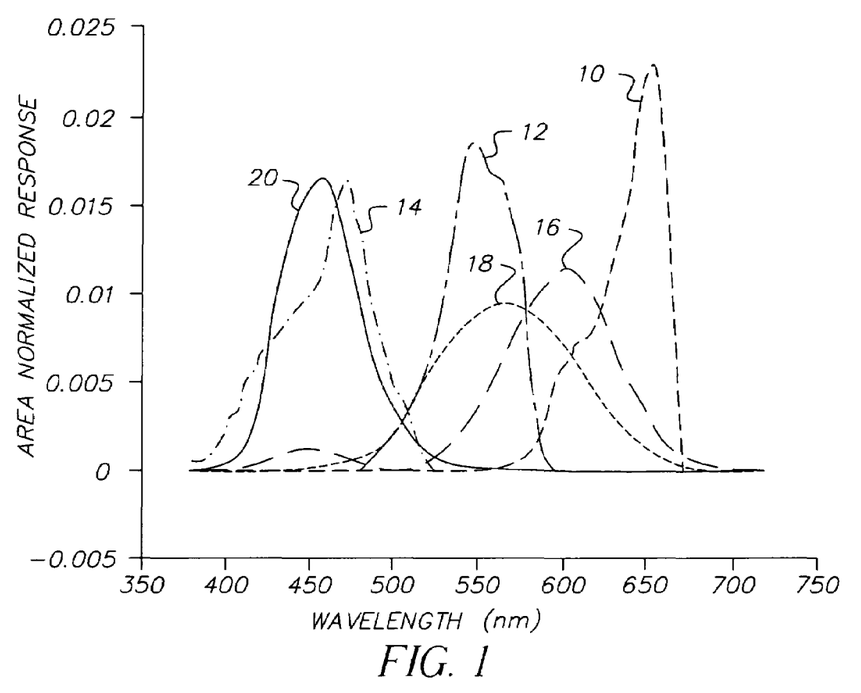
FIG. 1 shows a typical set of spectral sensitivity curves of a known motion picture film co-plotted with the 1931 CIE color-matching functions that correspond to the human visual system.

Because traditional film systems have been used in the majority of cinematographic productions in the past decades, the "film look" has been chosen as the preferred look in many electronic applications. Generally, images captured by film systems differ somewhat from the "original scene" contrast and colorimetry. This discrepancy arises from the spectral differences between the human visual system—commonly represented by a set of color-matching functions—and the set of spectral sensitivity curves of the film used in conjunction with chemical image processing. FIG. 1 illustrates this point by co-plotting two such sets of curves balanced for a particular light source: curves 10, 12 and 14 represent a film response for red, green and blue, respectively, and curves 16, 18 and 20 represent the 1931 CIE (Commision Internationale De L'Eclairage) color matching functions for a set of primaries $\bar{x}(\lambda), \bar{y}(\lambda), \bar{z}(\lambda)$ that correspond to the human visual system. Therefore, a capture system which "perceives" light in the same way as the human visual system offers the possibility of high colorimetric reproduction accuracy. In order to be able to quantify differences between the human visual system (HVS) and a traditional film system, it is helpful to briefly review a few notions of colorimetry and image science.

If a surface (object) reflects light according to a function Ref($\lambda$), where $\lambda$ represents wavelength values of visible light, this object is said to have a spectral reflectance given by Ref($\lambda$). Consequently, in order to quantify light reflected from the object and captured by a specific capture system, the following additional elements must be accounted for:

I($\lambda$): the spectral power distribution of the light source used to illuminate the object.

$SR_c(\lambda)$: the set of spectral response curves pertinent to the capture device. The index $c$ refers to different "light channels" in the capture system. In the case of the human visual system or a film system, $c$ assumes each of three values: red (r), green (g), or blue (b).

Mathematically, these elements are related as follows:

$$R = k_r \cdot \int_{\lambda-visible} SR_r(\lambda) \cdot I(\lambda) \cdot Ref(\lambda) d\lambda$$

$$G = k_g \cdot \int_{\lambda-visible} SR_g(\lambda) \cdot I(\lambda) \cdot Ref(\lambda) d\lambda$$

$$B = k_b \cdot \int_{\lambda-visible} SR_b(\lambda) \cdot I(\lambda) \cdot Ref(\lambda) d\lambda$$

Eq. 1a, 1b, 1c

In Equations 1a, 1b and 1c, the constants $k_r, k_g, k_b$ are used for normalization purposes and the integrals are performed over a range of wavelength values which correspond to visible light. For the purpose of the present invention, the wavelength values ($\lambda$) used to represent visible light are given by the range: 380 nm $\leq \lambda \leq$ 720 nm. If $SR_r, SR_g, SR_b$ represent, respectively, a set of color-matching functions (for example, $\bar{x}(\lambda), \bar{y}(\lambda), \bar{z}(\lambda)$), then the values R, G and B are called tristimulus values and represented by X, Y and Z, respectively. If $SR_r, SR_g, SR_b$ represent the spectral response set of a film system, then the values R, G and B are commonly referred to as relative exposure values or, for simplicity, relative exposures. In either case, the values R, G and B offer a measure of the contents of red, green and blue light, respectively, which is reflected off the object and enters the capture system. These values can be converted into fractional quantities with the aid of the following expressions:

$$r = \frac{R}{R+G+B}$$

$$g = \frac{G}{R+G+B}$$

$$b = \frac{B}{R+G+B}$$

Eq. 2a, 2b, 2c

Those skilled in the art refer to r, g and b as chromaticity coordinates. From Equations 2a, 2b and 2c it is clear that:

$$r+g+b=1 \qquad \text{Eq. 3}$$

A chromaticity diagram characterizes any set of colors by plotting one chromaticity coordinate versus another (g versus r, in this example), for each color in the set. If a chromaticity diagram displays the points that correspond to all monochromatic sources of light in the visual portion of the electromagnetic spectrum, the figure formed encompasses all physically realizable colors, and it is called the spectral locus. A comparison of chromaticity diagrams which characterize two distinct capture systems conveys important information regarding the color reproduction capabilities of each imaging system.

The color accuracy of a particular photographic system is defined according to how closely that system matches the HVS. This match can be measured with the computation of the average CIE (Commision Internationale De L'Eclairage) 1976 (L*a*b*) color difference ($\overline{\Delta E}^*_{ab}$) for a diagnostic color patch set containing N patches. (A preferred set is the diagnostic color patch set disclosed in Appendix A of U.S. Pat. No. 5,582,961, which is incorporated herein by reference. The test colors of this set consist of 190 entries of known spectral reflectance specified at 10 nm increments, as set forth in the aforementioned Appendix.) $\overline{\Delta E}^*_{ab}$ is calculated according to Equation 4:

$$\overline{\Delta E}^*_{ab} = \frac{\sum_{i=1}^{N} \Delta E^*_{ab,i}}{N} \quad \text{Eq. 4}$$

The color difference value for each patch, $$\Delta E^*_{ab,i},$$

is calculated between the 1976 CIE (L*a*b*)-space (CIELAB space) coordinates for each patch and the 1976 CIE (L*a*b*)-space coordinates which correspond to a transformation of the exposure signals captured by the photographic element.

$$\Delta E^*_{ab,i} = \sqrt{(L^*_{TPS,i} - L^*_{HVS,i})^2 + (a^*_{TPS,i} - a^*_{HVS,i})^2 + (b^*_{TPS,i} - b^*_{HVS,i})^2} \quad \text{Eq. 5}$$

The index TPS refers to "transformed photographic system", while HVS refers to "human visual system". The (L*a*b*) coordinates used in Equation 5 are computed as follows:

$$L^*_{HVS,i} = 116 \cdot \sqrt[3]{\frac{Y_i}{Y_n}} - 16 \quad \text{Eq. 6a, 6b, 6c}$$

$$a^*_{HVS,i} = 500 \cdot \left[\sqrt[3]{\frac{X_i}{X_n}} - \sqrt[3]{\frac{Y_i}{Y_n}}\right]$$

$$b^*_{HVS,i} = 200 \cdot \left[\sqrt[3]{\frac{Z_i}{Z_n}} - \sqrt[3]{\frac{Y_i}{Y_n}}\right]$$

$$L^*_{TPS,i} = 116 \cdot \sqrt[3]{\frac{G_i}{Y_n}} - 16 \quad \text{Eq. 7a, 7b, 7c}$$

$$a^*_{TPS,i} = 500 \cdot \left[\sqrt[3]{\frac{R_i}{X_n}} - \sqrt[3]{\frac{G_i}{Y_n}}\right]$$

$$b^*_{TPS,i} = 200 \cdot \left[\sqrt[3]{\frac{B_i}{Z_n}} - \sqrt[3]{\frac{G_i}{Y_n}}\right]$$

The tristimulus values and exposure values $X_i, Y_i, Z_i, R_i, G_i, B_i$ are calculated according to Equations 1a, 1b and 1c. Also, the values $X_i, Y_i, Z_i$ may or may not account for a color correction matrix. The values $X_n, Y_n, Z_n$ correspond to the tristimulus values of the light source used. Lower values of $\overline{\Delta E}^*_{ab}$ indicate higher color accuracy for the transformed photographic system.

The problem of lack of color reproduction accuracy is pointed out in commonly-assigned U.S. Pat. Nos. 5,582,961 (Photographic Elements Which Achieve Colorimetricaly Accurate Recording) and 5,609,978 (Method For Producing An Electronic Image From A Photographic Element), which both issued in the name of Giorgianni et al. In these patents, Giorgianni et al. benchmarks commercially available color negative films against the 1931 CIE color-matching functions based not only on the criteria described in equations 1 through 7, but also on a parameter that quantifies the level of noise introduced by transformation matrices. The comparisons performed demonstrate the lack of colorimetric accuracy between actual scenes and reproductions of those scenes on film systems. Giorgianni et al. describes a traditional photographic element that responds to light similarly to the human visual response to light. This is accomplished by having light sensitive records with sensitivity curves that are similar, in shape, to color-matching functions. After chemically processing the photographic element, the image content is transferred to a computer via a scanning device. In the computer, a matrix is applied to the image signals with the intent of further improving color reproduction accuracy, before the signal is finally sent to a display device. An electronic capture system with response curves that emulate color-matching functions would be highly advantageous over the system described in the aforementioned U.S. Pat. No. 5,609,978, since the electronic capture system would not require any chemical processing or scanning, and would significantly reduce the cost involved in practicing the disclosed method.

Figure 2A:
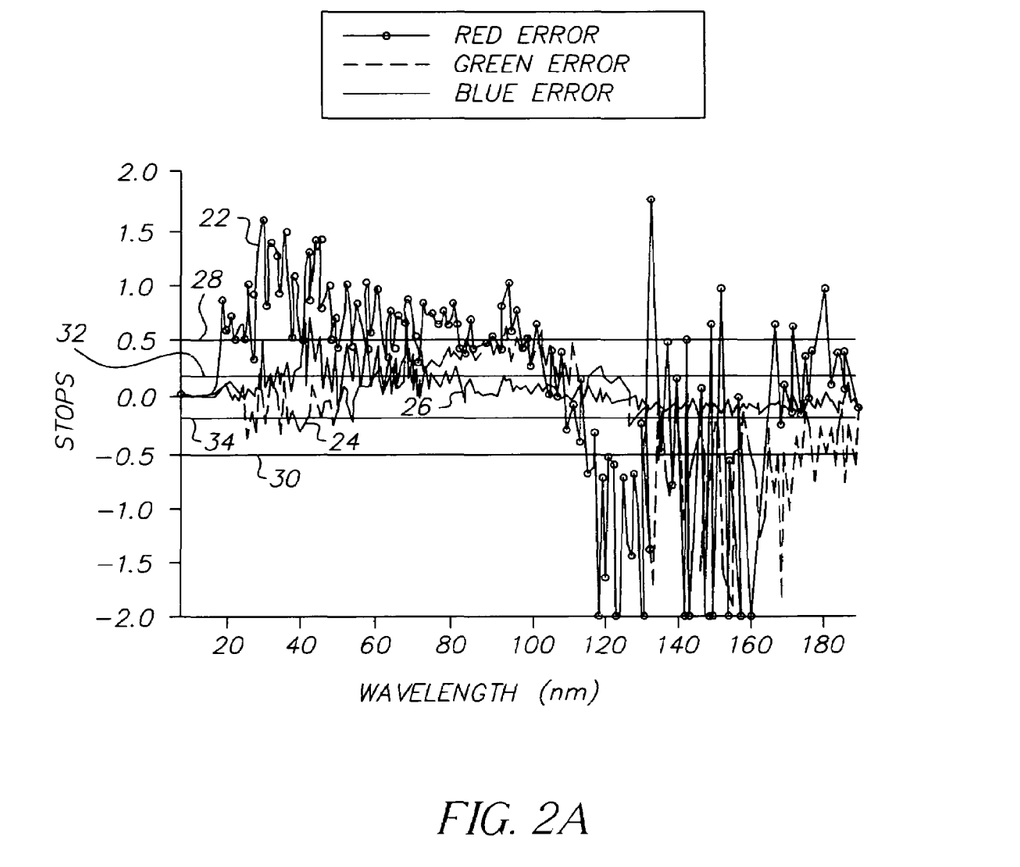
FIG. 2A shows a plot of exposure errors for red, green and blue exposure values computed with a typical set of color motion picture negative film response curves, relative to tristimulus values computed with the 1931 CIE color-matching functions.
Figure 2B:
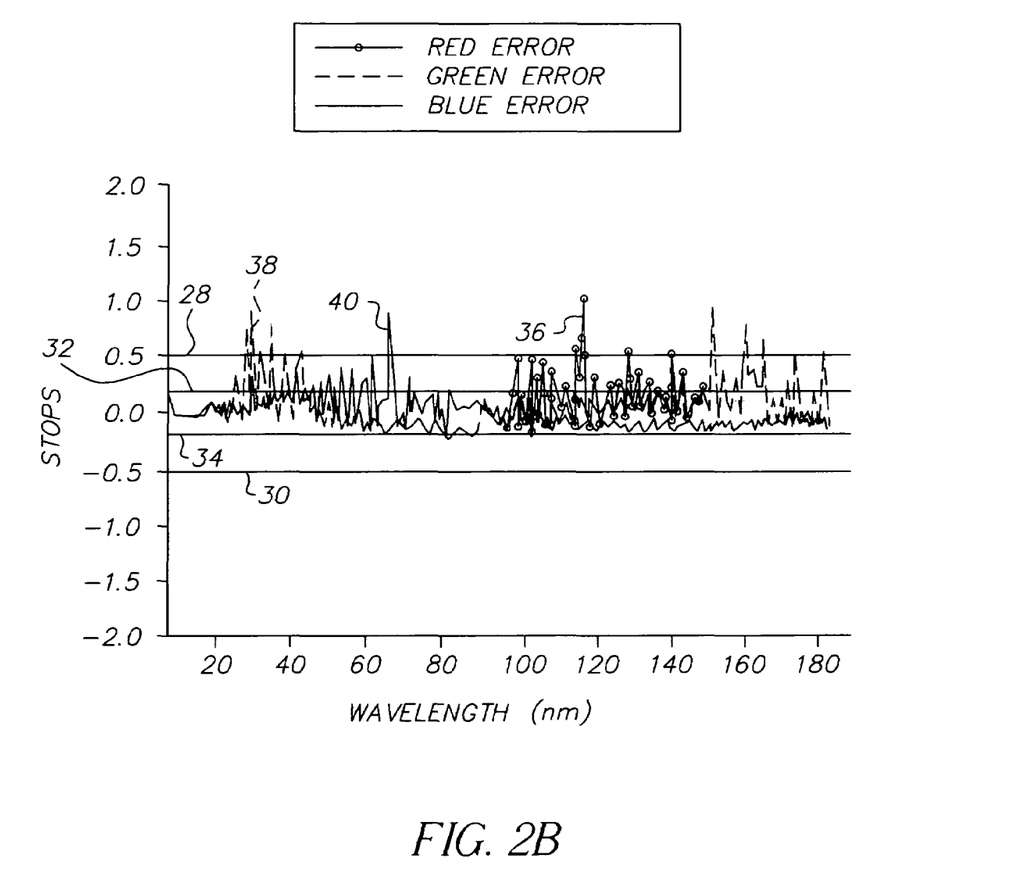
FIG. 2B shows a plot of exposure errors for red, green and blue exposure values computed for a typical high definition video camera, relative to tristimulus values computed with the 1931 CIE color-matching functions.

A second limitation that pertains to prior art photographic systems and capture devices in general relates to the gamut of colors that can be captured by those systems. FIGS. 2A and 2B evaluate the performance of two distinct capture systems: a typical motion picture color negative film and a typical high definition video camera (HD Video Rec. 709). FIG. 2A shows exposure error curves 22, 24 and 26 for red, green and blue exposure values computed with a typical set of color negative film response curves, relative to tristimulus values computed with the 1931 CIE color-matching functions. The red, green and blue errors are measured on the y-axis, in stops. Each point on the x-axis corresponds to one of the 190 patches described in Appendix A of the aforementioned U.S. Pat. No. 5,582,961. The solid horizontal lines 28 and 30 determine the +0.5 stop and -0.5 stop error levels, respectively, whereas the solid horizontal lines 32 and 34 determine the +⅙ stop and -⅙ stop error levels, respectively. FIG. 2B performs the same exposure comparison, now showing exposure error curves 36, 38 and 40 for red, green and blue exposure values computed for a typical high definition video camera relative to the human visual system, represented by the 1931 CIE color-matching functions. In both cases, given exposure values R, G, B and tristimulus values X, Y, Z that are computed according to equations 1a, 1b and 1c, the red, green and blue errors are computed according to equations 8a, 8b and 8c, respectively, with tungsten 3200 K° as the light source chosen.

$$\text{Error}_R = \frac{1}{\log_{10}(2)} \cdot \log_{10}\left(\frac{R}{X}\right) \quad \text{Eq. 8a, 8b, 8c}$$

$$\text{Error}_G = \frac{1}{\log_{10}(2)} \cdot \log_{10}\left(\frac{G}{Y}\right)$$

$$\text{Error}_B = \frac{1}{\log_{10}(2)} \cdot \log_{10}\left(\frac{B}{Z}\right)$$

FIGS. 2A and 2B show that several patches, when captured by the film system or the video camera, contain large error values. This implies that a large number of colors that can be discriminated by the human visual system cannot be accurately captured by either system, with the gamut being less for video than film image capture systems. Therefore, an electronic capture device with a color gamut larger than what is currently available is highly desirable.

A third problem, particular to electronic or hybrid capture devices known in the prior art, relates to the level of noise introduced during processing of the image signals. The majority of the operations performed in the image processing path involves the application of matrices and/or look-up tables (LUTs) to input image signals. Look-up tables require intense computational power, since the volumes of image data in applications related to the motion picture industry are, in general, very large. Matrices are less computationally intensive. Either method can introduce considerable noise to the original signals. For matrices, the level of noise introduced depends on the magnitude of the coefficients used.

The color reproduction and noise problems described in the previous paragraphs point to the need for an electronic capture device with the following features:

- A set of spectral sensitivity curves that captures exposures relative to a set of visual RGB color matching spectral responsivities.
- A color gamut superior to what is offered by electronic video capture devices and traditional photographic systems based on currently available technology.
- An image-processing path that limits the level of introduced signal noise to low thresholds.

In commonly assigned U.S. Pat. No. 5,668,596 (which issued Sep. 16, 1997 in the name of R. M. Vogel and is entitled "Digital Imaging Device Optimized for Color Performance"), the patentee recognizes that it is desirable that the overall spectral sensitivities of the camera correspond to a set of all positive color matching functions that can be derived from the spectral response of the human eye via a linear 3×3 transformation. If these requirements are met, the camera will be able to discern color information in the scene in much the same way that a human observer would. Failure to achieve this goal will result in color reproduction errors. Accordingly, Vogel optimizes the capture device for color reproduction by a pre-defined combination of spectral response curves and a color-correction matrix. In this manner, greater color reproduction accuracy can be achieved in a digital camera by the combination of a set of spectral response curves modeled after all-positive color-matching functions and a color-correction matrix. The color correction matrix coefficients are computed in order to provide optimization of color reproduction for a unique combination of image sensor, passive optical elements and light source.

Notwithstanding the efforts in the prior art, there remains a need for an improved method and capture system which provide ways of solving the color reproduction problems described. In particular, attention must be devoted to solving these problems in better and more cost-effective ways than those provided by the prior art.

SUMMARY OF THE INVENTION

The present invention is directed to overcoming one or more of the problems set forth above. Briefly summarized, according to one aspect of the present invention, an electronic color capture system includes an imaging section for generating a plurality of color image signals from an image, wherein the imaging section has predetermined spectral sensitivities defining its spectral response, and an optical section for separating the image into its separate color content and directing the separate color content toward the imaging section, wherein the optical section has specific spectral characteristics which define its spectral response. The spectral responses of the optical section and the imaging section are selected so as to cascade together to provide all-positive, symmetrical system curves modeled upon red, green and blue color matching functions representative of the human visual system. The color matching functions are derived from three monochromatic light sources and contain no more than three positive lobes as well as one or more negative lobes, wherein the areas under the color matching functions determined by (a) summation of all negative lobes and (b) overlap between the green and red color matching functions are minimized. The color image signals are processed with a color correction matrix having coefficients optimized for signal-to-noise performance for producing an output color image exhibiting an accurate color reproduction of the input image.

These and other aspects, objects, features and advantages of the present invention will be more clearly understood and appreciated from a review of the following detailed description of the preferred embodiments and appended claims, and by reference to the accompanying drawings.

ADVANTAGES OF THE INVENTION

This invention presents several advantages over the technology and devices in the prior art. One such advantage over current electronic capture systems is the accuracy of color capture, which is a result of the match between the human visual system and the unique set of spectral response curves and the correction matrix used in the invention. This implies, in the absence of any "preferred looks," an electronic image capture system having an advantage for those applications requiring highly accurate color capture—e.g. motion picture special effects. Another major advantage relates to the suggested physical setup of the capture device, which utilizes a set of optical filters optimized for light intensity distribution between the red and green channels (exposure optimization). The criteria for maintaining high signal-to-noise for producing the required correction matrix, and is desirable for high quality reproduction of images. These advantages offer a feasible system providing not only highly accurate colorimetric capture and reproduction, but also an improvement in overall signal-to-noise performance.

DETAILED DESCRIPTION OF THE INVENTION

Because imaging devices employing electronic sensors are well known, the present description will be directed in particular to elements forming part of, or cooperating more directly with, apparatus and method in accordance with the present invention. Elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts. This description focuses on the key individual elements that compose the optical path and the image processing path present according to the current invention and responsible for obtaining high color reproduction accuracy, as well as on the characterization of the response curves used according to the invention. Aspects of this invention which are common to electronic capture systems in general are well understood by those skilled in the art and require no further discussion.

In accordance with the invention, an electronic capture system is provided with spectral response curves and image processing elements which are specifically designed to obtain maximum accuracy in color reproduction. The method utilized for the design of the spectral response curves and the image processing path of the electronic capture device described in this invention has its foundation set on the following goals:

Achieve high accuracy in color reproduction.
Minimize the noise introduced by matrix operations in the image processing path.
Choose color-primaries that optimize the display gamut.
Define the spectral response curves with functions that can be implemented in physical devices at low cost.
Optimize the light distribution among each of the three channels (red, green, blue).

In the prior art, it is known to investigate some of the five considerations mentioned above. As an example, in the aforementioned U.S. Pat. No. 5,668,596, greater color reproduction accuracy was achieved in a digital camera by the combination of a set of spectral response curves modeled after all-positive color-matching functions and a color-correction matrix. However, the disclosed technique does not consider the problem of light distribution which allows for optimum capture efficiency between the red-light sensitive and the green-light sensitive portions of the sensor, which is a problem inherent to spectral response curves modeled after color-matching functions. Failure to consider this problem leads to an undesirable lack of control over the trade-off that exists between color reproduction accuracy and the loss of responsivity in the red and green channels due to the large spectral overlap area between these two channels.

Consequently, one cannot find a solution of all five problems simultaneously in the prior art. An integrated solution, as disclosed herein in a preferred embodiment, to all the five aforementioned problems overcomes the weak points and drawbacks present in current electronic and traditional capture systems.

Figure 3:
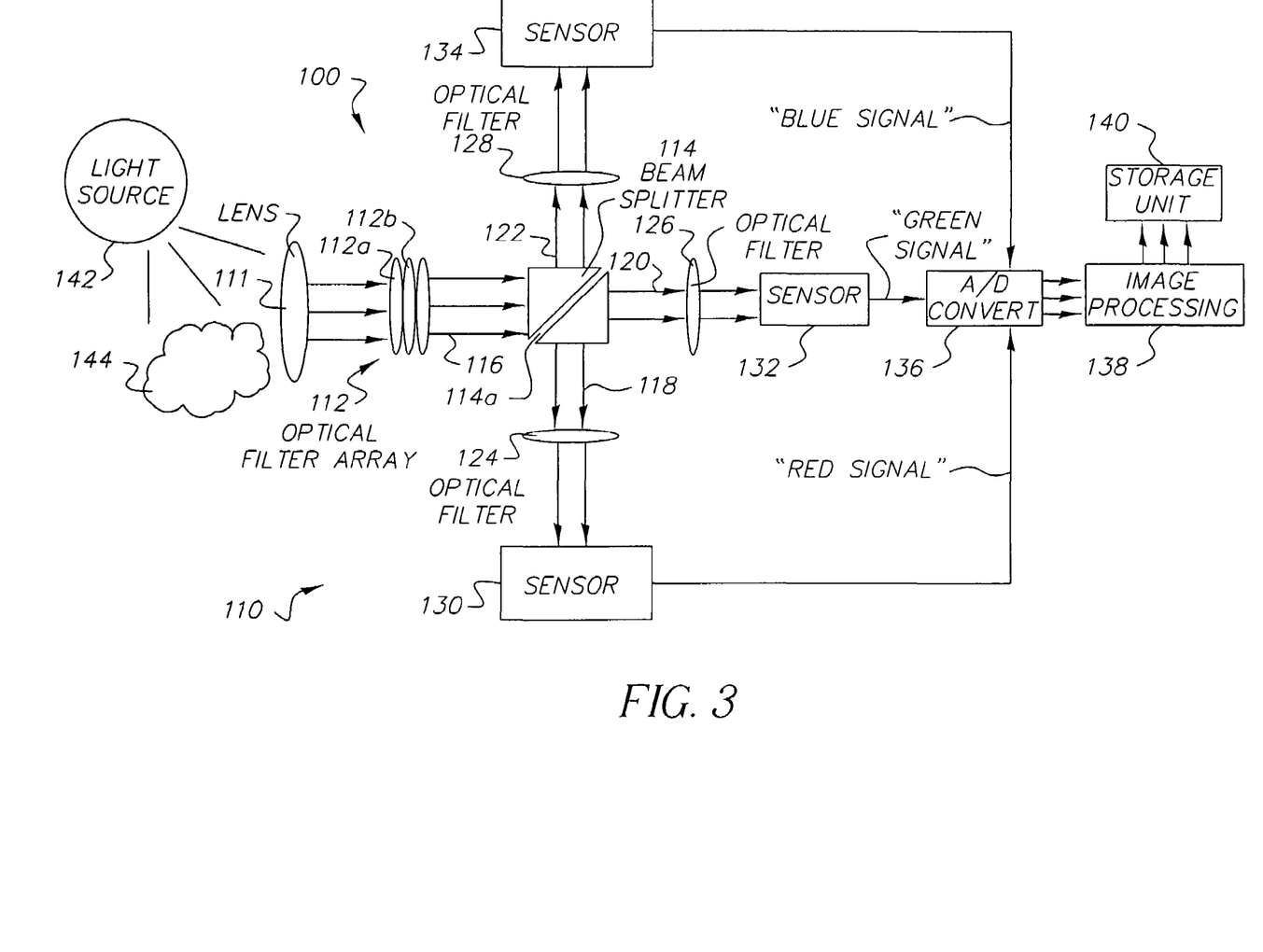
FIG. 3 illustrates a block diagram of an image capture apparatus configured according to the invention to provide improved color reproduction accuracy.

FIG. 3 shows an electronic capture device 100 for either still or motion pictures; therefore the device 100 may be configured as either a still or motion picture camera. The capture device 100 includes an optical section 110 which includes a lens 111 for forming an image that is transmitted through an optical filter array 112 to a color-selective beam splitter 114. The beam splitter 114 includes, e.g., a dichroic layer 114a for separating the incoming beam 116 into three spectrally separated color beams 118, 120, 122 that are directed through respective cutoff filters 124, 126, 128. The filtered light beams output by the optical section 110 (i.e., output by the cutoff filters 130, 132, 134) are directed to an imaging section comprising three separate image sensors 130, 132, 134. The image sensors are conventional monochromatic electronic devices such as charge-coupled devices (CCD) or CMOS devices. Each sensor produces an analog color signal corresponding to the intensity of the colored light beam that is incident upon the sensor. The respective analog color signals from the sensors 130, 132, 134 are converted into digital signals by an analog-to-digital (A/D) converter 136 and applied to an image processing unit 138. The processed image signals are then stored in a storage unit 140. It should also be understood that certain of the components, such as the image processing unit 138 and the storage unit 140, may be physically separated from a digital camera embodying the optics and sensors, although all of the components may be considered to be part of an image capture apparatus or electronic color image capture system.

In operation, light from a light source 142 is reflected from an object 144 to the electronic capture device 100. The reflected light is transmitted through the lens 111 and the initial array of optical filters 112, which may be optional but preferably includes an infra-red filter 112a and a blur filter 112b. The filtered light traverses the beam-splitter 114, which has transmission and reflection characteristics designed such that the green content of input light is passed to the image sensor 132, the red content is passed to the image sensor 130 and the blue content is passed to the image sensor 134. The optical filters 124, 126 and 128 are placed between the beam splitter 114 and the image sensors 130, 132 and 134, respectively, to customize the spectral characteristics of the respective light beams. In particular, the transmittance curves for the beam splitter 114 and the optical filters 124, 126 and 128 are designed such that the overall effect of the cascaded optical elements—for a particular "white" (i.e. color temperature) light source—is equivalent to the filtration provided by the RGB system response curves 150, 152 and 154 shown in FIG. 4, as modified by the spectral responses of the respective image sensors and other elements of the optical system 110, such as the lens 111 and the optical array 112. For example, the red system response curve 154 is substantially equivalent to the concatenation of the red spectral response of the beam splitter 114 and the spectral shape of the optical filter 124 with the spectral response of the image sensor 130, and so on for the other curves. After the light is collected onto the sensors 130, 132 and 134, analog image signals are formed and converted to digital image signals by the A/D converter 136. In the image-processing unit 138, a color-correction matrix is applied to the digital image signals, which are then stored in the storage unit 140.

FIG. 3 illustrates an exemplary physical configuration of the key components present according to the invention. Other image capture configurations of the invention are possible, e.g., configurations based on dual or single light sensors—as opposed to the three sensors shown in the example—could also be implemented by those skilled in the art. For instance, the imaging section may consist of a single image sensor and the color filtration would be provided by a mosaic color filter placed in front of, or on the surface of, the image sensor. The mosaic filter would have individual filter elements that would separate the image light into its color content. The spectral response of the optical section would then include the filter characteristics of the mosaic filter and the optical characteristics of other optical elements that might be in the path of the image light.

Figure 4:
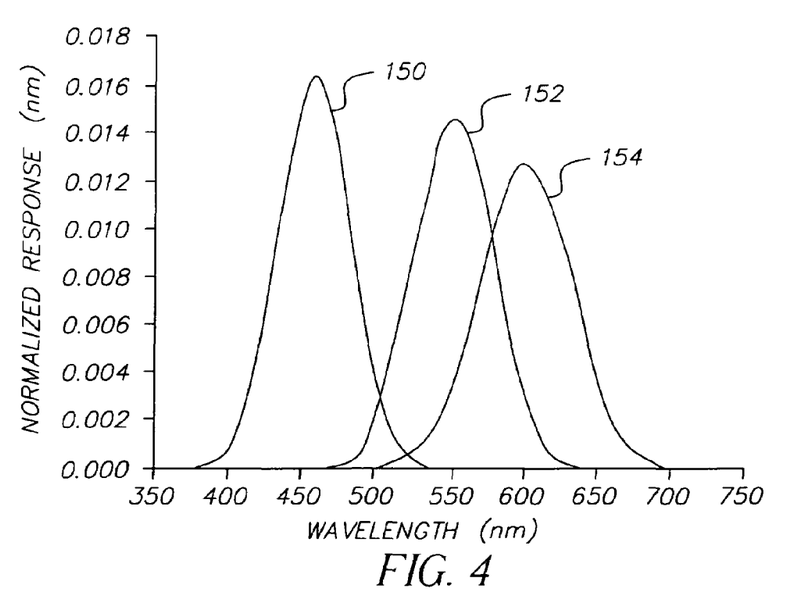
FIG. 4 shows a set of RGB system response curves used in the present invention and balanced for tungsten 3200 K.

The system response curves shown in FIG. 4 are approximations to color-matching functions that correspond to the spectral response curves which characterize this invention. In *The Theory of The Photographic Process*, Fourth Edition, New York: Macmillan Publishing Co., 1977 (particularly Chapter 19, section II., by F. Clapper, pages 561–577, which is incorporated herein by reference), the author discusses the importance of finding a set of all-positive spectral sensitivity curves (for a photographic film) that closely correspond to a set of color-matching functions. Clapper further describes a method for generating a correlation coefficient, which he calls a quality factor (q), between the actual spectral sensitivity and the nearest color matching function. The quality factor (q), which varies between 0.0 and 1.0 (1.0 being a perfect match and a theoretical 0.0 being an extremely poor correlation), is mathematically defined in the article (pages 567–568) and a method is employed to search for a set of all-positive spectral sensitivity curves that yield high q-values. It should be emphasized that one of ordinary skill in this art would understand Clapper's technique for estimating the q values, further details of which can be found in Chapter 19 of *The Theory of The Photographic Process*, Fourth Edition.

Clapper points out that it is possible that more than one set of curves may have the same high quality factor and yet their performances might differ significantly from one to the other. In other words, the quality factor should be interpreted as a mathematical correlation coefficient and should not be used without good judgment in the process of defining a set of spectral response curves for a capture device. Another important point that can be observed from Clapper's results relates to the overlap between the red light and the green light sensitivity curves or for the sake of simplicity, the red and green curves. Sets of response curves with high quality factor values require, inevitably, a large area overlap between the red and green curves, which imposes problems of implementation and cost efficiency if an electronic capture device is to be built with such a response set.

Figure 5:
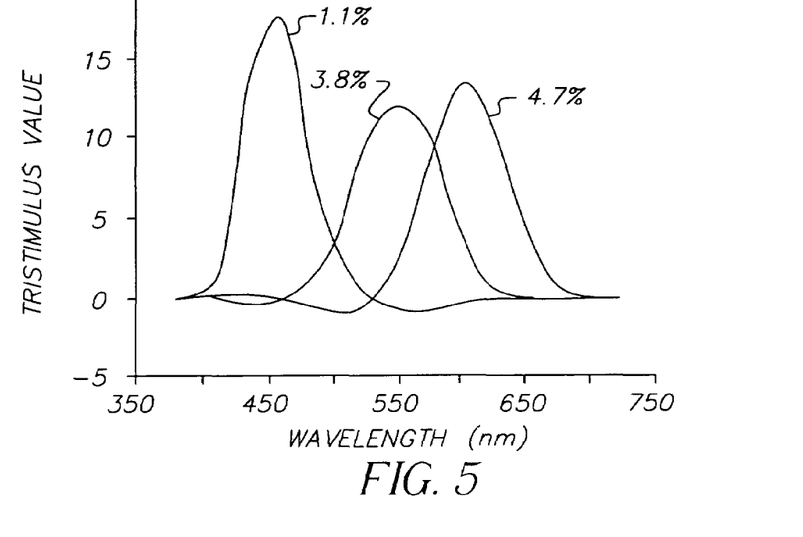
FIG. 5 shows a set of color-matching functions which serve as aim curves for the design of the spectral response curves shown in FIG. 4.

In order to obtain optimum color reproduction from a set of spectral response curves according to the invention, the spectral response curves (shown in FIG. 4) are modeled after a set of color-matching functions (shown in FIG. 5) that meet the following criteria:

- The color-matching functions are derived from three monochromatic light sources and, consequently, contain negative regions (lobes) as well as positive regions. Preferably, the positive regions contain no more than three lobes.
- The area under the curves determined by the summation of all negative lobes is minimized.
- The area under the curves determined by the overlap between the green light and the red light sensitivity curves is minimized.
- The choice of monochromatic color-primaries is such that the previous criteria are met and that the color-gamut encompassed by these primaries, in a chromaticity diagram representation, is maximized.

Figure 6:
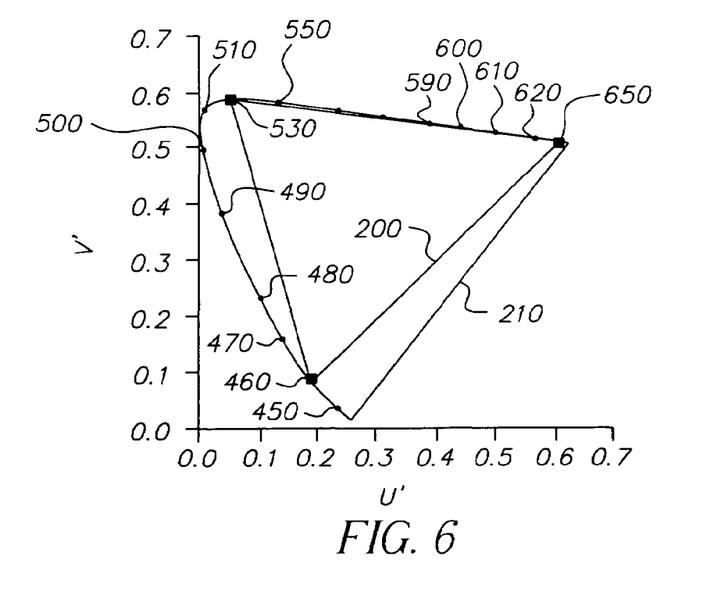
FIG. 6 illustrates a chromaticity diagram showing the improved color reproduction according to the invention.

A search for wavelength values that define the three color-primaries was performed with extensive use of the exhaustion technique, where substantially all possible sets of values were tried. The iterations were performed with wavelength values that ranged as follows:

$620 \text{ nm} \leq \lambda_R \leq 660 \text{ nm}$ $510 \text{ nm} \leq \lambda_G \leq 550 \text{ nm}$ $440 \text{ nm} \leq \lambda_B \leq 470 \text{ nm}$ FIG. 5 depicts the color-matching function set that corresponds to the minimum summation of the negative lobe area and the red and green overlap area, under the constraint imposed by having the largest possible color-gamut. The curves are color balanced for a tungsten 3200 K light source and the corresponding wavelength values for the color-primaries are as follows:

$\lambda_R = 650 \text{ nm}$ $\lambda_G = 530 \text{ nm}$ $\lambda_B = 460 \text{ nm}$ The corresponding chromaticity diagram is presented in FIG. 6, which shows a locus 200 of points representing the color gamut of the image capture device 100 shown in FIG. 3 utilizing the spectral response curves shown in FIG. 4. This gamut may be compared to the locus 210 of points corresponding to the position of pure spectrum colors, i.e., the spectral locus of all physically realizable colors.

The optical components of the image capture system are responsible for determining the shape of spectral sensitivity curves for a given imaging system. In a paper entitled "Optimization of Camera Spectral Sensitivities", by S. Quan, N. Ohta and N. Katoh (IS&T/SID Eighth Color Imaging Conference, 2000), a plurality of functions are used to describe optical filters, which are responsible for determining the shape of spectral sensitivity curves for a given imaging system. Regardless of the mathematical model chosen, this paper emphasizes that practical systems require smooth, nonnegative functions with a small number of parameters. In particular, a feasible system requires that each filter have no more than 5 parameters. According to the publication, the set of spectral sensitivity curves is to be designed by maximizing a pre-defined measure of goodness imposed on the functions that provide a mathematical model for those filters. In particular, sets of three cubic spline functions and sets of functions composed of sums of Gaussians are tested. Throughout the paper, Quan et al. focuses on modeling the "optimum" response curves in terms of functions that are smooth, non-negative and characterized by a small number of parameters. However, no specific attempt is made to minimize the overlap area between the red and green response curves. In the case of the present invention, a set of three all-positive symmetrical, specifically Gaussian, curves is chosen to model the color-matching functions associated with the unique set of color-primaries $\lambda_R, \lambda_G, \lambda_B$. Aside from adjustable gain factors, each of the Gaussian curves ($F_k(\lambda)$) is described by two parameters, as shown in the following equation:

$$F_k(\lambda) = e^{\left(\frac{\lambda - \overline{\lambda}_k}{2\sigma_k}\right)^2} \qquad \text{Eq. 9}$$

where k represents each of the three channels (r, g, b), $\overline{\lambda}_k$ is the mean value of the Gaussian curve corresponding to channel k and $\sigma_k$ is the standard deviation value corresponding to channel k. The following set of parameters defines the set of Gaussian curves that best matches the aim set of color-matching functions.

$\bar{\lambda}_R = 600$ nm $\bar{\lambda}_G = 550$ nm $\bar{\lambda}_B = 450$ nm $\sigma_R = 75$ nm $\sigma_G = 65$ nm $\sigma_B = 60$ nm The system response curves shown in FIG. 4 which characterize the electronic capture system represented by this invention are obtained by cascading the individual spectral sensitivity and/or spectral transmittance and/or spectral reflectance curves of any optical elements (lenses, prisms, filters, electronic sensors, among others) present in the optical path of the invention. Any optical filters which are part of the preferred embodiment for the invention are designed with spectral transmittance curves such that the cascading of all the optical elements which are part of the invention corresponds to a set of spectral response curves identical, aside from adjustable gain factors, to the Gaussian curves described by $\bar{\lambda}_R, \bar{\lambda}_G, \bar{\lambda}_B, \sigma_R, \sigma_G, \sigma_B$.

A correction matrix is placed in the image processing path (in the image processing unit 138) of the invention. The match between the aim set of color-matching functions and the set of spectral response curves which characterize this invention is optimized by the unique combination of Gaussian curves parameterized by $\bar{\lambda}_R, \bar{\lambda}_G, \bar{\lambda}_B, \sigma_R, \sigma_G, \sigma_B$ with the correction matrix. The nine coefficients of the 3×3-correction matrix are designed such that two error-measuring parameters are minimized. The first parameter consists of $\overline{\Delta E^*}_{ab}$, as defined in Equation 4. The second parameter, $\Psi_N$, measures the level of signal noise introduced by the correction matrix. For a generic correction matrix, $M_{cor}$ represented by:

$$M_{cor} = \begin{bmatrix} m_{1,1} & m_{1,2} & m_{1,3} \\ m_{2,1} & m_{2,2} & m_{2,3} \\ m_{3,1} & m_{3,2} & m_{3,3} \end{bmatrix} \quad \text{Eq. 10}$$

The parameter $\Psi_N$ is defined as the sum of the square roots of the sum of the squares of the elements of each row in the matrix $M_{cor}$ which transforms the exposure signals. Mathematically this parameter $\Psi_N$ is expressed as:

$$\Psi_N = \sum_{j=1}^{3} \sqrt{\sum_{i=1}^{3} m_{i,j}^2} \quad \text{Eq. 11}$$

where i and j represent row and column numbers, respectively, of the elements of $M_{cor}$. (This parameter $\Psi_N$ is referred to a noise-gain factor, and is described in detail in the aforementioned U.S. Pat. No. 5,609,978.)

The diagnostic patch set used for the calculation of $\overline{\Delta E^*}_{ab}$ and $\Psi_N$, described in Appendix A of the aforementioned U.S. Pat. No. 5,582,961, contains 190 patches and encompasses a large variety of hues and saturations, as well as selective neutral patches. The 1931 CIE chromaticity values for all 190 patches are displayed in the aforementioned Appendix A. Tungsten 3200 K was used as the light source.

For computational purposes, the light source was represented by the properly scaled spectral power distribution curve of a blackbody at a color temperature of 3200 K. A plurality of lenses and electronic imaging sensors, represented by, respectively, their spectral transmittance and spectral sensitivity curves, was used in the calculations of $\overline{\Delta E^*}_{ab}$ and $\Psi_N$ and a table of results was formed. Based on such results, the performance of the present invention is characterized by:

$\overline{\Delta E^*}_{ab} \leq 2.5$ $\Psi_N \leq 3.5$

The invention has been described with reference to a preferred embodiment. However, it will be appreciated that variations and modifications can be effected by a person of ordinary skill in the art without departing from the scope of the invention. For instance, it should be understood that the function of the beam splitter 114 may be performed by a variety of devices and configurations that separate different wavelength ranges among the sensors 130, 132, and 134. Such configurations include techniques for directing image light of separate color content upon a single sensor, i.e., the "beam splitting" function may be performed by a color-selective component, integrally formed with the sensor, such as a color filter array (CFA or mosaic) overlying the single sensor or different color selective layers within the single sensor.

PARTS LIST 10 film response (red)
12 film response (green)
14 film response (blue)
16 CIE color matching function
18 CIE color matching function
20 CIE color matching function
22 red exposure error
24 green exposure error
26 blue exposure error
28 +0.5 stop line
30 −0.5 stop line
32 +⅙ stop line
34 −⅙ stop line
36 red exposure error
38 green exposure error
40 blue exposure error
100 electronic capture device
110 optical section
111 lens
112 optical filter array
112a infrared filter
112b blur filter
114 beam splitter
114a dichroic layer
116 incoming beam
118 color beam
120 color beam
122 color beam
124 optical filter
126 optical filter
128 optical filter
130 image sensor
132 image sensor
134 image sensor
136 A/D converter 138 image processing unit
140 storage unit
150 blue system response curve
152 green system response curve
154 red system response curve
200 locus representing capture device color gamut
210 locus representing pure spectrum colors

What is claimed is:

1. An electronic color capture system for capturing a color image and producing an accurate color reproduction of the color image, said system comprising:

a plurality of image sensors for capturing the image and generating a plurality of color image signals from the captured image, each image sensor having predetermined spectral sensitivities defining the spectral response of the image sensor;

an optical section including at least one optical element for directing image light of a particular color content toward each image sensor and at least one cutoff filter in an optical path of each image sensor for filtering the color light content directed upon the respective image sensor, said optical section having spectral characteristics comprised of specific optical element characteristics and specific filter characteristics which together define the spectral response of the optical section;

wherein the spectral responses of the optical section and the image sensors are selected so as to cascade together to provide all-positive, Gaussian system curves modeled upon red, green and blue color matching functions representative of the human visual system and derived from three monochromatic light sources, wherein each of the Gaussian system curves, $F_k(\lambda)$, is described by parameters $\bar{\lambda}_k$ and $\sigma_k$, where $\bar{\lambda}_k$ is the mean value of the Gaussian curve, $\sigma_k$ is the standard deviation value, and k represents each of the three corresponding color channels (red, green, and blue) as shown in the following equation:

$$F_k(\lambda) = e^{\left(\frac{\lambda - \bar{\lambda}_k}{2\sigma_k}\right)^2}$$

said color matching functions containing no more than three positive lobes as well as one or more negative lobes, and whereby the areas under the color matching functions determined by minimizing both (i) a summation of all negative lobes and (ii) an overlap between the green and red color matching functions;

a color correction matrix containing matrix coefficients that are selected by minimizing at least two error measuring parameters including one parameter measuring the color difference between the color image signals and the human visual system and the other parameter measuring the level of signal noise in the color image signals; and a processor for applying the color correction matrix to the color image signals produced by the image sensors, thereby producing an output color image signal exhibiting an accurate color reproduction of the color image.

2. The system as claimed in claim 1 whereby the conditions that the areas under the color matching functions, as (a) determined by the summation of all negative lobes be minimized and (b) determined by the overlap between the green and red sensitivity curves be minimized, are constrained by the requirement that the largest possible color gamut is maintained in the output, color image.

3. The system as claimed in claim 1 wherein said plurality of image sensors includes three image sensors and the optical element is a beam splitter for directing image light of different color content toward the respective image sensors.

4. The system as claimed in claim 1 wherein the error measuring parameter measuring the difference between the color image signals and the human visual system is $\overline{\Delta E}^*_{ab}$, which is calculated according to:

$$\overline{\Delta E}^*_{ab} = \frac{\sum_{i=1}^{N} \Delta E^*_{ab,i}}{N}$$

where the color difference value $\Delta E^*_{ab,i}$ for a diagnostic color patch set containing N patches is calculated for the difference between the 1976 CIE (L*a*b*)-space (CIELAB space) coordinates for each patch and the 1976 CIE (L*a*b*)-space coordinates which correspond to a transformation of the exposure signals captured by the image sensors.

5. The system as claimed in claim 4 wherein $\overline{\Delta E}_{ab} \leq 2.5$.

6. The system as claimed in claim 1 wherein the parameter measuring the level of signal noise in the color image signals is a parameter $\Psi_N$ defined as the sum of the square roots of the sum of the squares of the matrix coefficients of each row in the color correction matrix which transforms the color image signals.

7. The system as claimed in claim 6 wherein $\Psi_N \leq 3.5$.

8. A method for capturing an image and producing an accurate color reproduction of the image, said method comprising the steps of:

providing an imaging section having predetermined spectral sensitivities defining a spectral response of the imaging section, said imaging section capturing the image and generating a plurality of color image signals from the captured image;

providing an optical section having specific spectral characteristics which define a spectral response of the optical section, said optical section separating the image into its separate color content and directing the separate color content toward said imaging section;

selecting the spectral responses of the optical section and the imaging section so that they cascade together to provide all-positive, Gaussian system curves modeled upon red, green and blue color matching functions representative of the human visual system and derived from three monochromatic light sources, wherein each of the Gaussian system curves, $F_k(\lambda)$ is described by parameters $\bar{\lambda}_k$ and $\sigma_k$, where $\bar{\lambda}_k$ is the mean value of the Gaussian curve, $\sigma_k$ is the standard deviation value, and k represents each of the three corresponding color channels (red, green, and blue) as shown in the following equation:

$$F_k(\lambda) = e^{\left(\frac{\lambda - \bar{\lambda}_k}{2\sigma_k}\right)^2}$$

said color matching functions containing no more than three positive lobes as well as one or more negative lobes, and whereby the areas under the color matching functions determined by minimizing both (i) a summation of all negative lobes and (ii) an overlap between the green and red color matching functions; and processing the color image signals with a color correction matrix having coefficients optimized for signal-to-noise performance for producing an output color image from the color image signals exhibiting an accurate color reproduction of the color image.

9. The method as claimed in claim 8 wherein the color correction matrix includes matrix coefficients that are selected by minimizing (a) the color difference between the color image signals and the human visual system and (b) the level of signal noise in the color image signals.

10. The method as claimed in claim 8 whereby the conditions that the areas under the color matching functions, as (a) determined by the summation of all negative lobes be minimized and (b) determined by the overlap between the green and red sensitivity curves be minimized, are constrained by the requirement that the largest possible color gamut is maintained in the output color image.

11. The method as claimed in claim 8 wherein the spectral responses of the optical section and the imaging section are selected so as to cascade together to provide all-positive, Gaussian system curves modeled upon said red, green and blue color matching functions.

* * * * *